(12) United States Patent
Pinarbasi (10) Patent No.: US 9,007,727 B2
(45) Date of Patent: Apr. 14, 2015

(54) MAGNETIC HEAD HAVING CPP SENSOR WITH IMPROVED STABILIZATION OF THE MAGNETIZATION OF THE PINNED MAGNETIC LAYER

(75) Inventor: Mustafa Michael Pinarbasi, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 2400 days.

(21) Appl. No.: 11/879,667

(22) Filed: Jul. 17, 2007

(65) Prior Publication Data

US 2009/0021870 A1 Jan. 22, 2009

(51) Int. Cl.
*G11B 5/33* (2006.01)
*G11B 5/127* (2006.01)
*G11B 5/39* (2006.01)
*B82Y 10/00* (2011.01)
*B82Y 25/00* (2011.01)

(52) U.S. Cl.
CPC .............. *G11B 5/3909* (2013.01); *B82Y 10/00* (2013.01); *B82Y 25/00* (2013.01); *G11B 5/3929* (2013.01); *G11B 2005/3996* (2013.01)

(58) Field of Classification Search
USPC ................................................... 360/324.11
See application file for complete search history.

(56) References Cited

U.S. PATENT DOCUMENTS

| | | | |
|---|---|---|---|
| 5,729,410 A | 3/1998 | Fontana, Jr. et al. | |
| 5,905,611 A | 5/1999 | Yoda et al. | |
| 6,005,753 A | 12/1999 | Fontana, Jr. et al. | |
| 6,344,954 B1 | 2/2002 | Redon et al. | |
| 6,563,679 B1 | 5/2003 | Li et al. | |
| 6,636,395 B1 * | 10/2003 | Terunuma | 360/324.11 |
| 6,724,582 B2 | 4/2004 | Funayama et al. | |
| 6,762,915 B2 | 7/2004 | Pokhil et al. | |
| 6,943,998 B2 | 9/2005 | Shimazawa et al. | |
| 7,046,487 B2 | 5/2006 | Terunuma | |
| 7,190,559 B2 * | 3/2007 | Kagami et al. | 360/324.11 |
| 7,365,949 B2 * | 4/2008 | Hayakawa et al. | 360/324.1 |
| 7,652,856 B2 * | 1/2010 | Pinarbasi | 360/324.11 |
| 2004/0061986 A1 * | 4/2004 | Kagami et al. | 360/324.11 |
| 2004/0095691 A1 * | 5/2004 | Lin et al. | 360/324.1 |
| 2004/0207960 A1 * | 10/2004 | Saito et al. | 360/324.1 |
| 2004/0207962 A1 | 10/2004 | Saito et al. | |
| 2005/0195536 A1 | 9/2005 | Kagami et al. | |
| 2005/0270703 A1 | 12/2005 | Hayakawa et al. | |
| 2008/0144234 A1 * | 6/2008 | Lin | 360/324.11 |

FOREIGN PATENT DOCUMENTS

JP 10335714 12/1998

* cited by examiner

*Primary Examiner* — Adam B Dravininkas
(74) *Attorney, Agent, or Firm* — Zilka-Kotab, PC (57) ABSTRACT

A magnetic head having a CPP read head sensor that includes a layered sensor stack including an antiferromagnetic (AFM) layer, a pinned magnetic layer, and a free magnetic layer. The pinned magnetic layer is comprised of a high, positive magnetostriction material and has a thickness t and a height (H), such that the ratio (t/H) of the thickness t to the height H of the pinned magnetic layer is fabricated to be within the range of from approximately $1/10$ to approximately $1/500$. Ion milling is conducted at a grazing angle to the surface of the layer upon which the pinned magnetic layer is fabricated, where the ion beam is oriented in the direction of the desired magnetization of the pinned magnetic layer.

22 Claims, 4 Drawing Sheets

MAGNETIC HEAD HAVING CPP SENSOR WITH IMPROVED STABILIZATION OF THE MAGNETIZATION OF THE PINNED MAGNETIC LAYER

BACKGROUND OF THE INVENTION

1. Field of the Invention

The present invention relates generally to read head portions of magnetic heads for hard disk drives and more particularly to the stabilization of the magnetization of magnetic layers of current perpendicular to plane (CPP) read sensors for magnetic heads.

2. Description of the Prior Art

A computer disk drive stores and retrieves data by positioning a magnetic read/write head over a rotating magnetic data storage disk. The head reads from or writes data to concentric data tracks defined on surface of the disks. The heads are fabricated in structures called "sliders" and the slider flies above the surface of the disk on a thin cushion of air, where the surface of the slider which faces the disks is called an Air Bearing Surface (ABS).

Some recent read sensor structures use a current perpendicular to plane (CPP) sensor, which can be a TMR or GMR sensor, for reading the magnetic field signals from the rotating magnetic data storage disk. A TMR sensor typically includes a nonmagnetic electrically insulative tunnel barrier layer sandwiched between a pinned magnetic layer and a free magnetic layer. The pinned layer in turn is typically fabricated on an antiferromagnetic (AFM) pinning layer which fixes the magnetization of the pinned layer at an angle of 90 degrees to the air bearing surface (ABS). The magnetization of the free layer is free to rotate from a quiescent or zero bias point position in response to magnetic field signals from magnetic data bits written on the rotating magnetic disk. Hard bias elements are typically disposed on either side of the free magnetic layer to provide the necessary magnetization bias for the free magnetic layer. The sensor layers are typically disposed between first and second magnetic shield layers, where these first and second shield layers also serve as first and second electrical lead layers for conducting a sensor current through the device. The sensor is thus configured to conduct sensor current perpendicular to the planes (CPP) of the film layers of the sensor, as opposed to previously developed sensors where the sensor current is directed in the planes (CIP) or parallel to film layers of the sensor. In a CPP GMR sensor the tunnel barrier layer is replaced with a conductive material layer, as is known to those skilled in the art. Such CPP configurations are attracting more attention recently, as they apparently can be made to be more sensitive than the CIP configuration, and thus are more useful in higher data density tracks and disks.

Improved hard disk drives are manufactured with an ever increasing areal data storage density, which requires narrower and more closely spaced data tracks on the hard disk. As a result, the size of the read sensors must be reduced, and as the size of the sensors is reduced the stabilization of the magnetization of the magnetic layers of the read sensor, such as the pinned magnetic layer, is compromised. There is therefore a need for fabrication methods that create increased stabilization of the magnetization of the pinned magnetic layer which results in improved performance characteristics for the smaller read sensors that are utilized in higher density hard disk drives.

SUMMARY OF THE INVENTION

The present invention includes a magnetic head having a CPP read head, which may include a TMR or GMR sensor. The CPP sensor includes a layered sensor stack including an antiferromagnetic (AFM) layer, a pinned magnetic layer, a tunnel barrier layer (TMR) or a conductive layer (GMR), a free magnetic layer and a cap layer. Biasing elements may be disposed on the sides of the free magnetic layer or within the sensor stack to provide a biasing direction for the magnetization for the free magnetic layer. The present invention combines three methods that together increase the stability of the magnetization of the pinned magnetic layer.

One of the methods of an embodiment of the present invention to increase the stability of the magnetization of the pinned magnetic layer is to increase its height (H), such that the ratio (t/H) of the thickness t to the height H of the pinned magnetic layer is fabricated to be within the range of from approximately 1/10 to approximately 1/500. This is an increase of the height (H) of the pinned magnetic layer as compared to the prior art. This increased height H of the pinned magnetic layer relative to its thickness increases the shape anisotropy of the pinned magnetic layer, resulting in increased stiffness and stability of the magnetization of the pinned magnetic layer.

An additional method of an embodiment of the present invention to increase the stability of the magnetization of the pinned magnetic layer is to conduct ion milling at a grazing angle to the surface of the layer upon which the pinned magnetic layer is deposited. This surface may be the upper surface of the antiferromagnetic layer upon which the pinned magnetic layer material is deposited, or the surface of an underlayer for the pinned magnetic layer, in sensor designs where such an underlayer is utilized. In this method the ion beam is oriented in the direction of the desired magnetization of the pinned magnetic layer, which is typically perpendicular to the air bearing surface, and a grazing angle of approximately 45° to 80° from normal to the surface is effective, where the ion beam has a relatively low energy of from 30 eV to 200 eV and preferably less than 100 eV.

An additional method of an embodiment of the present invention to increase the stabilization of the magnetization of the pinned magnetic layer is to increase the magnetostriction of the pinned magnetic layer. This can be accomplished by fabricating the pinned magnetic layer from a material that has high positive magnetostriction, such that the pinned magnetic layer resists changes in its magnetization. A desirable material is CoFe where the Fe is present in the range of 40 at. % to 50 at. %.

It is an advantage of the magnetic head of an embodiment of the present invention that it includes a CPP read sensor having improved pinning of the magnetization of the pinned magnetic layer.

It is another advantage of the magnetic head of an embodiment of the present invention that it includes a CPP read sensor having pinned magnetic layer with increased magnetization stabilization.

It is a further advantage of the magnetic head of an embodiment of the present invention that it includes a CPP read sensor having pinned magnetic layer wherein shape anisotropy is utilized to increase the stabilization of the magnetization of the pinned magnetic layer.

It is yet another advantage of the magnetic head of an embodiment of the present invention that it includes a CPP read sensor having a pinned magnetic layer wherein ion milling, at grazing angle of a surface upon which the pinned magnetic layer is fabricated, is utilized to increase the stabilization of the magnetization of the pinned magnetic layer.

It is an advantage of a hard disk drive of an embodiment of the present invention that it includes the magnetic head of the present invention having a CPP read sensor having pinned magnetic layer with increased magnetization stabilization.

It is another advantage of a hard disk drive of an embodiment of the present invention that it includes the magnetic head of the present invention having a CPP read sensor having improved pinning of the magnetization of the pinned magnetic layer.

It is a further advantage of the hard disk drive of an embodiment of the present invention that it includes a magnetic head of the present invention that includes a CPP read sensor having a pinned magnetic layer wherein shape anisotropy is utilized to increase the stabilization of the magnetization of the pinned magnetic layer.

It is yet another advantage of the hard disk drive of an embodiment of the present invention that it includes a magnetic head that includes a CPP read sensor having a pinned magnetic layer wherein ion milling at a grazing angle of a surface upon which the pinned magnetic layer is fabricated, is utilized to increase the stabilization of the magnetization of the pinned magnetic layer.

These and other features and advantages of embodiments of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF EMBODIMENTS

Figure 1:
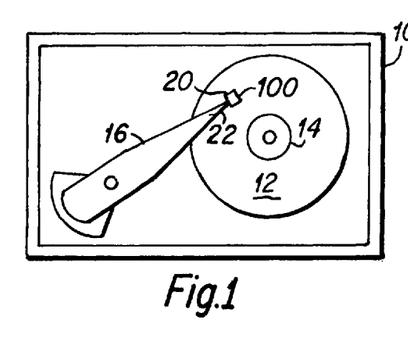
FIG. 1 is a top plan view depicting a hard disk drive of an embodiment of the present invention having a magnetic head of an embodiment of the present invention.

FIG. 1 is a top plan view that depicts significant components of a hard disk drive 10 of the present invention which includes the magnetic head of the present invention. The hard disk drive 10 includes a magnetic hard disk 12 that is rotatably mounted upon a motorized spindle 14. An actuator arm 16 is pivotally mounted within the hard disk drive 10 with a slider device 20 having a magnetic head 100 of an embodiment of the present invention disposed upon a distal end 22 of the actuator arm 16. A typical hard disk drive 10 may include a plurality of disks 12 that are rotatably mounted upon the spindle 14 and a plurality of actuator arms 16 having a plurality of sliders 20 mounted upon the distal ends 22 of the plurality of the actuator arms 16. As is well known to those skilled in the art, when a hard disk drive is operated, the hard disk 12 rotates upon the spindle 14 and the slider acts as an air bearing that is adapted for flying above the surface of the rotating disk. The slider includes a substrate base upon which various layers and structures that form the magnetic head 100 are fabricated. Such sliders with their magnetic heads are fabricated in large quantities upon a wafer substrate and subsequently sliced into discrete devices.

A typical magnetic head will include both a read head portion and a write head portion. The read head portion is utilized to read data that has been written upon the hard disk 12, and the write head portion is utilized to write data to the disk 12. Read head sensors are generally of two types, current-in-plane (CIP) and current-perpendicular-to-plane (CPP) as is well known to those skilled in the art. The present invention is directed to the read head portion of a magnetic head, and particularly to such read heads that include a CPP sensor, which includes TMR sensors that have a tunnel barrier layer structure, and GMR sensors that have a conductive layer structure, as are known in the art and as are next described with aid of FIGS. 2, 3 and 4.

Figure 2:
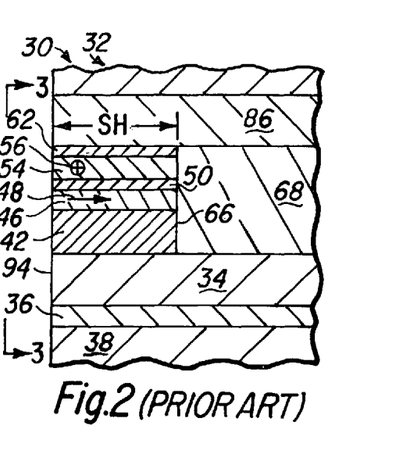
FIG. 2 is a side cross-sectional view of a tunnel barrier sensor portion 30 of a prior art magnetic head 32 taken along lines 2-2 of FIGS. 3 and 4.
Figures 3, 4:
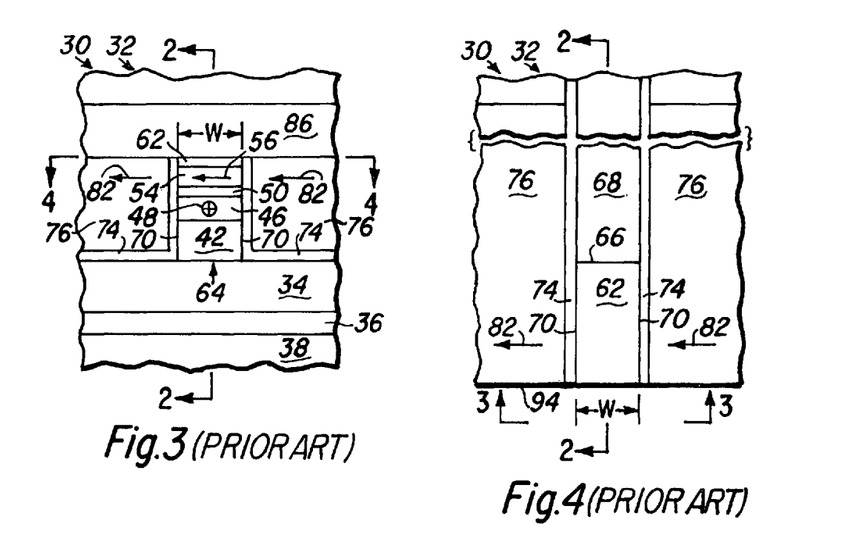
FIG. 3 is a side elevational view of the tunnel barrier sensor 30 depicted in FIG. 2, taken from the air bearing surface of the magnetic head 32 along lines 3-3 of FIG. 2.
FIG. 4 is a top plan view depicting the tunnel barrier sensor portion 30 of the prior art magnetic head 32 taken along lines 4-4 of FIG. 3.

FIG. 2 is a side cross-sectional view of a TMR sensor portion 30 of a prior art magnetic head 32 taken along lines 2-2 of FIGS. 3 and 4, FIG. 3 is a side elevational view of the TMR sensor 30 depicted in FIG. 2, taken from the air bearing surface of the magnetic head 32 along lines 3-3 of FIG. 2, and FIG. 4 is a top plan view depicting the TMR sensor portion 30 of the prior art magnetic head 32 taken along lines 4-4 of FIG. 3. As is indicated herein, embodiments of the present invention are suitable for use with a CPP TMR sensor and CPP GMR sensor, however the description herein will focus upon the TMR sensor embodiments for ease of understanding, where those skilled in the art will understand its application to GMR sensors upon reading the following description. As is best seen in FIGS. 2 and 3, the TMR sensor 30 includes a plurality of thin film layers. These layers include a first magnetic shield layer 34 that is fabricated upon an electrical insulation layer 36 that is deposited upon a wafer substrate 38. While many different layered sensor structures are known in the prior art, a typical sensor layer structure will include an antiferromagnetic layer 42 which may be comprised of a Pt—Mn or Ir—Mn alloy that is fabricated upon or over the first magnetic shield layer 34. A pinned magnetic layer 46 is fabricated upon or over the antiferromagnetic layer 42, and it may be comprised of a magnetic material such as a Co—Fe alloy. The direction of magnetization of the pinned magnetic layer (see arrow 48) is generally perpendicular to the air bearing surface (ABS) of the magnetic head.

Thereafter, a tunnel barrier layer 50 is fabricated upon or over the pinned magnetic layer 46, where the tunnel barrier layer 50 may be comprised of an electrical insulation material such as $MgO_x$, $TiO_x$, and $AlO_x$, where the subscript x indicates that the oxide need not be stoichiometric. In a CPP GMR sensor structure the layer 50 will be comprised of a conductive material such as copper. A free magnetic layer 54 is then fabricated upon or over the layer 50, where the free magnetic layer 54 may be composed of a magnetic material such as a Co—Fe alloy or a Ni—Fe alloy. Alternatively, the free magnetic layer may be comprised of an antiparallel coupled layer structure of materials such as CoFe/Ru/CoFe, as is known to those skilled in the art. The direction of magnetization of the free magnetic layer (see arrow 56) is nominally in the plane of the free magnetic layer, however it is free to rotate in response to the magnetic field of magnetic data bits of the disk 12. Thereafter, a cap layer 62 is typically fabricated upon or over the free magnetic layer 54, and a typical cap layer may be comprised of a material such as rhodium, ruthenium or tantalum or a combination thereof. As can be best understood with the aid of FIGS. 3 and 4, the layers 42-62 are then masked and ion milled in a plurality of steps to create a central sensor stack 64 having a back wall 66 and side walls 70. Fill material 68, such as alumina, is then deposited. As seen in the top plan view of FIG. 4, the distance W between the side walls 70 of the sensor 30 defines the read width of the sensor.

Following the ion milling steps for creating the back wall 66 and side walls 70, a thin layer of electrical insulation 74 is next deposited upon the device, particularly upon the side walls 70, utilizing a process such as atomic layer deposition (ALD). Thereafter, magnetic hard bias elements 76, typically composed of a material such as a Co—Pt alloy, are fabricated upon the insulation layer 74 proximate the side walls 70. The back edge 80 of the hard bias elements 76 extends significantly beyond the back wall 66 of the sensor stack. The direction of magnetization of the hard bias elements (see arrows 82) is desirably in the same direction as the magnetization 56 of the free magnetic layer, in that the magnetization of the hard bias element stabilizes the free magnetic layer. A second magnetic shield 86 is then fabricated upon the cap layer 62 and hard bias elements 76. In fabricating the head 32, following the fabrication of the read head structures, and following subsequent fabrication steps to create write head structures (not shown), an air bearing surface (ABS) 94 is created. The distance between the ABS 94 and the back wall 66 of the sensor stack is termed the stripe height (SH) of the sensor.

A magnetic head including a tunnel barrier sensor 30 operates by the passage of electrical sensor current from the first magnetic shield 34, through the sensor layers 42-62 and into the second magnetic shield 86, such that the current travels perpendicular to the planes (CPP) of the layers 42-62. The electrical insulation layer 74 serves to guide the sensor current through the sensor layers. The tunnel barrier sensor, such as is depicted in FIGS. 2-4 operates by detecting magnetic data bits written upon the hard disk 12 through a change in electrical resistance within the sensor when the sensor is exposed to the magnetic field of the data bit. Specifically, the direction 56 of the free layer magnetization is altered by the magnetic field of a data bit, and the change in the direction of the free layer magnetization relative to the direction 48 of the pinned magnetic layer magnetization creates a change in the electrical resistance of the sensor. This change in the resistance then affects the electrical current flowing through the sensor, and the change in sensor current flow is detected and interpreted as a data signal. The magnetic field 48 from the pinned magnetic layer must be stable to serve as a constant relative to the changing direction 56 of the free magnetic layer from its nominal direction shown in FIGS. 2-4. The operational characteristics of tunnel barrier sensors are well known to those skilled in the art, and a more detailed description thereof is not deemed necessary in order to fully describe the features of the present invention.

Improved hard disk drives are manufactured with an ever increasing areal data storage density, which requires narrower and more closely spaced data tracks on the hard disk and a higher bits per inch (BPI) in the data tracks. As a result, the size of the read sensors must be reduced, and as the size of the read sensors is reduced the stabilization of the pinned magnetic layer by the AFM layer is becoming a problem. Additionally, the stabilization of the magnetization of the AFM layer is also becoming a problem where the magnetic heads are reduced in size. Particularly, as is depicted in FIG. 4, where the pinned magnetic layer 46 is reduced in size, the direction of magnetization 48 can rotate in response to external magnetic fields or other events that the magnetic head may encounter. When the direction of magnetization of the pinned magnetic layer is altered the performance of the CPP sensor may be significantly diminished. As indicated hereinbelow, the present invention provides improved stabilization of the magnetic properties of the pinned magnetic layer 46 and the AFM layer 42, thereby providing improved stabilization to the sensor.

Figure 5:
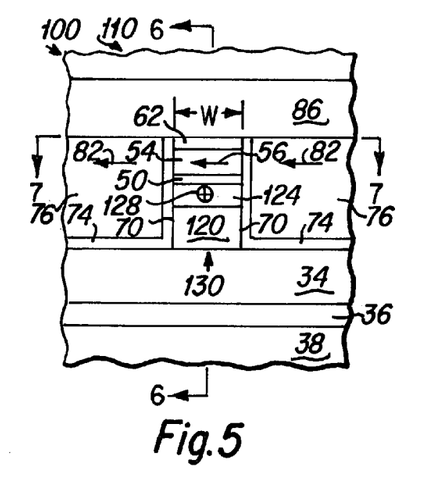
FIG. 5 is a side elevational view of the tunnel barrier sensor of a magnetic head of an embodiment of the present invention taken from the air bearing surface of the magnetic head.
Figure 6:
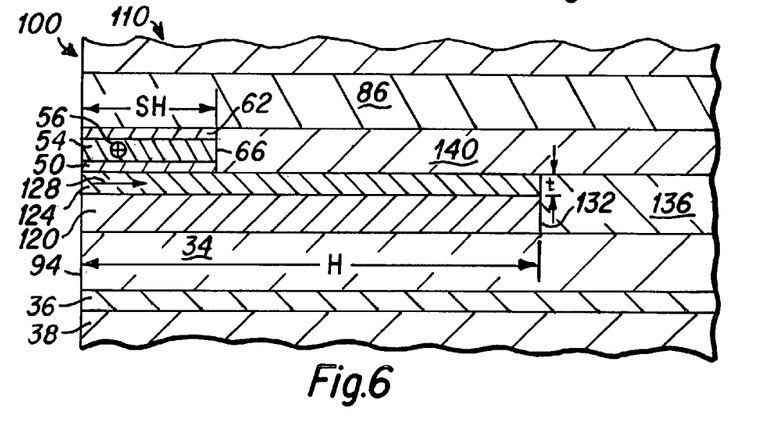
FIG. 6 is a side cross-sectional view of the tunnel barrier sensor of FIG. 5 taken along lines 6-6 of FIG. 5.
Figure 7:
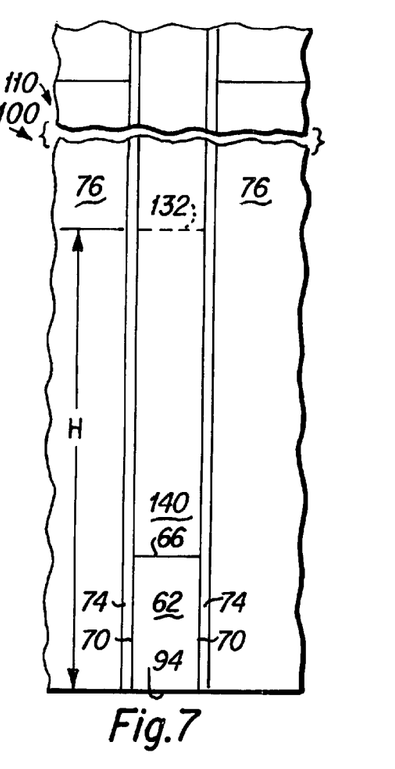
FIG. 7 is a top plan view depicting the tunnel barrier sensor portion of the magnetic head of FIG. 5 taken along lines 7-7 of FIG. 5.

An improved magnetic head 100 of an embodiment of the present invention, including an improved CPP sensor 110, is depicted in FIGS. 5, 6 and 7, in which FIG. 5 is an elevational view taken from the air bearing surface of the magnetic head 100, FIG. 6 is a cross-sectional view taken along lines 6-6 of FIG. 5, and FIG. 7 is a plan view taken from lines 7-7 of FIG. 5. As will be understood when reading the following description, a significant difference between the magnetic head embodiment 100 of the present invention and the prior art magnetic head 32 is the shape of the pinned magnetic layer and AFM layer. Therefore, the magnetic head 100 of an embodiment of the present invention includes many features and structures that are substantially similar to those of the prior art magnetic head 32, and such similar structures have been identically numbered for ease of comprehension.

As can be seen in FIGS. 5-7, the CPP sensor 110 includes a plurality of thin film layers. These layers include a first magnetic shield layer 34 that is fabricated upon or over an electrical insulation layer 36 that is deposited upon or over a wafer substrate 38. An antiferromagnetic layer 120 which may be comprised of a Pt—Mn or Ir—Mn alloy is fabricated upon or over the first magnetic shield layer 34. A pinned magnetic layer 124 is fabricated upon or over the antiferromagnetic layer 120, and it may be comprised of a magnetic material such as a Co—Fe alloy; in alternative embodiments the pinned magnetic layer 124 may be comprised of a multi-layer structure (not shown) such as Co—Fe, Ru, Co—Fe, as is known in the art. The direction of magnetization of the pinned magnetic layer (see arrow 128) is generally perpendicular to the air bearing surface (ABS) 94 of the magnetic head. Thereafter, a tunnel barrier layer 50 is fabricated upon or over the pinned magnetic layer 124, where the tunnel barrier layer 50 may be comprised of an electrical insulation material such as $MgO_x$, $TiO_x$, and $AlO_x$e where the subscript x indicates that the oxide need not be stoichiometric. In a CPP GMR sensor structure the layer 50 will be comprised of a conductive material such as copper. A free magnetic layer 54 is then fabricated upon or over the layer 50, where the free magnetic layer 54 may be composed of a magnetic material such as a Co—Fe alloy or a Ni—Fe alloy. Alternatively, the free magnetic layer may be comprised of an antiparallel coupled layer structure of materials such as CoFe/Ru/CoFe, as is known to those skilled in the art. The direction of magnetization of the free magnetic layer (see arrow 56) is nominally in the plane of the free magnetic layer, however it is free to rotate in response to the magnetic field of magnetic data bits of the disk 12. Thereafter, a cap layer 62 is typically fabricated upon or over the free magnetic layer 54, and a typical cap layer may be comprised of a material such as rhodium, ruthenium or tantalum or a combination thereof.

The layers 120, 124, 50, 54, 62 are then masked and ion milled in a plurality of steps to create a central sensor stack 130 having back walls 66 and 132 and side walls 70, and an embodiment of the present invention is particularly directed to these ion milling steps, as is described herebelow. Particularly, as can be seen in FIG. 6, the central sensor stack 64 is formed with a back wall 66 of the cap layer 62, free magnetic layer 54 and tunnel barrier layer 50. Additionally, a back wall 132 of the pinned magnetic layer 124 and AFM layer 120 is also created. The distance between the side walls 70 of the sensor 110 defines the read width W of the sensor. A detailed description of the fabrication of the AFM layer 120 and pinned magnetic layer 124 is provided below.

A thin layer of electrical insulation 74 is next deposited upon or over the device, particularly upon the side walls 70, utilizing a process such as atomic layer deposition (ALD). Thereafter, magnetic hard bias elements 76, typically composed of a material such as a Co—Pt alloy, are fabricated upon or over the insulation layer 74 proximate the side walls 70. A second magnetic shield 86 is subsequently fabricated upon or over the cap layer 62 and hard bias elements 76. Following the fabrication of the read head structures, and following subsequent fabrication steps to create write head structures (not shown), the air bearing surface (ABS) 94 is created. The distance between the ABS 94 and the back wall 66 is the stripe height (SH) of the sensor, and the distance between the ABS 94 and the back wall 132 is the height (H) of the pinned magnetic layer 124 and AFM layer 120.

The significant features of this embodiment of the present invention are best understood by comparing the depiction of the embodiment of the present invention in FIG. 6 with the depiction of the prior art magnetic head shown in FIG. 2. As can be seen in FIG. 6, the height H of the pinned magnetic layer 124 and AFM layer 120 is substantially increased from the height (the stripe height SH of the sensor 32) of the pinned magnetic layer 46 and AFM layer 42 of the prior art magnetic head 30.

The fabrication of the improved CPP sensor 110 can be accomplished in several different ways, as will be understood by those skilled in the art. One such method is to fabricate the CPP sensor 110 utilizing the identical fabrication steps that are known in the prior art through the fabrication stage in which the pinned magnetic layer 124 is deposited across the surface of the wafer. Thereafter, in a new process step, a pinned magnetic layer milling mask (not shown) is fabricated to cover the desired portions of the pinned magnetic layer 124 to create the back wall 132. Thereafter, in an ion milling step, the undesirable extended portions of the pinned magnetic layer 124 and AFM layer 120 are removed such that the back wall 132 is created. Thereafter, an insulative fill material 136 is deposited and the pinned magnetic layer milling mask is removed. The tunnel barrier layer 50, free magnetic layer 54 and cap layer 62 are then deposited, and the stripe height milling mask as is known in the prior art and described hereabove is then fabricated and used to mill away unmasked portions of the cap layer, free magnetic layer and tunnel barrier layer down to the pinned magnetic layer 124. Further fill material 140 is then deposited and the stripe height milling mask is removed. Thereafter, a read width milling mask (not shown), as is known in the art, is fabricated and utilized to create the sidewalls 70 of the sensor 110, as is depicted in FIG. 5.

Alternatively, all of the CPP sensor layers, the AFM layer 120, the pinned magnetic layer 124, the tunnel barrier layer 50, the free magnetic layer 54 and the cap layer 62, can be initially deposited full film upon the wafer surface. Thereafter, a pinned magnetic layer milling mask (not shown) can be fabricated, followed by ion milling of all of the layers down to the first magnetic shield 34. In doing so, the back wall 132, and thus the height H of the AFM layer 120 and pinned magnetic layer 124 is established. Thereafter, a fill material 136 is deposited, followed by the removal of the pinned magnetic layer milling mask. The stripe height milling mask can now be fabricated upon the device followed by the ion milling of the cap layer 62, free magnetic layer 54 and tunnel barrier layer 50 to create the back wall 66, and thus the stripe height SH of the sensor 110. Fill material 140 is then applied and the stripe height milling mask is then removed. The read width milling mask is then utilized to create the sidewalls 70 of the sensor, followed by the fabrication steps for creating the insulation layer 74, hard bias elements 76 and second magnetic shield 86, as has been described hereabove and are known in the art.

The stabilization of the magnetization of the pinned magnetic layer is important in controlling the performance of the magnetic head. This embodiment 100 of a magnetic head of the present invention utilizes the shape enhanced pinning anisotropy of the pinned magnetic layer 124 and the AFM layer 120 to enhance the stabilization of the magnetization of the pinned magnetic layer.

In stabilizing the magnetization of the pinned magnetic layer, a magnetization field of the pinned magnetic layer is opposed by a demagnetization field. By way of example, where the height H of a pinned magnetic layer is increased from an initial value such as 40 nm to a larger value such as 400 nm, the demagnetization field is reduced from a value such as approximately 650 Oe to a lower value such as approximately 6.5 Oe. This reduction in the demagnetization field results in a significantly more stable magnetization field of the pinned magnetic layer. This embodiment of the invention thus contributes to the stabilization of the magnetization of the pinned magnetic layer by altering the shape anisotropy of the pinned magnetic layer and AFM layer, and makes the pinned magnetic layer's magnetization stable against any large disturbing magnetic fields.

In one embodiment of the present invention, the pinned magnetic layer may have a thickness t in the range of approximately 1 nm to approximately 6 nm, and the thickness/height ratio (t/H) of the pinned magnetic layer is preferably within the range of from approximately 1/10 to approximately 1/500, with a preferred range of approximately 1/100 to approximately 1/400. The height H will generally be in the range of from approximately 30 nm to approximately 3000 nm. A pinned magnetic layer that is fabricated within these ranges will generally have increased magnetic stability due to shape anisotropy that provides an increased stabilization of the pinned magnetic layer magnetization. As magnetic heads are reduced in size for use in hard disk drives having increased areal data storage density, the improved stabilization of the magnetization of the pinned magnetic layer creates improved performance characteristics of magnetic heads of the present invention.

Figure 8:
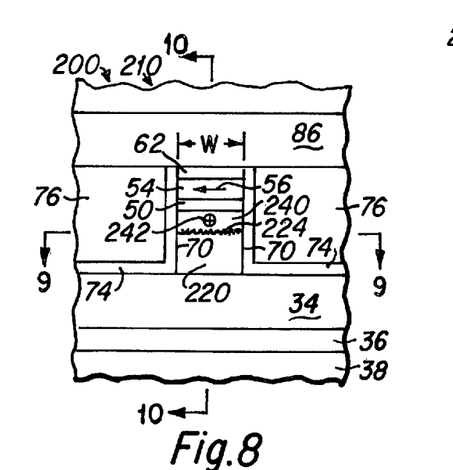
FIG. 8 is an elevational view of the tunnel barrier sensor of another magnetic head of an embodiment of the present invention taken from the air bearing surface of the magnetic head.
Figure 9:
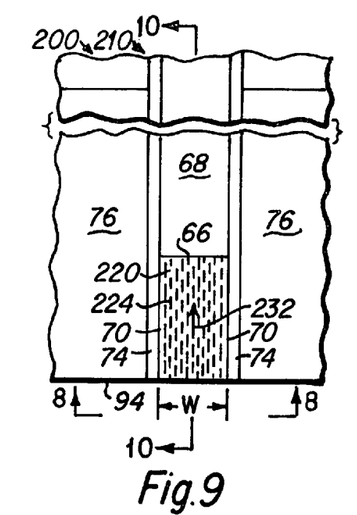
FIG. 9 is a top plan view depicting the tunnel barrier sensor portion of the magnetic head of FIG. 8 taken along lines 9-9 of FIG. 8.
Figure 10:
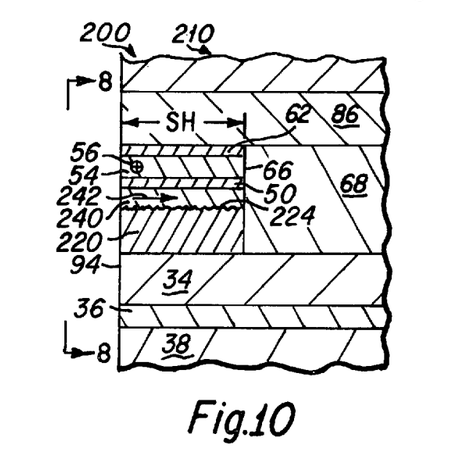
FIG. 10 is a side cross-sectional view of the tunnel barrier sensor of FIG. 8 taken along lines 10-10 of FIG. 8.

A method that further improves the stabilization of the magnetization of the pinned magnetic layer involves the ion milling, at a grazing angle, of the surface upon which the pinned magnetic layer is deposited. Specifically, magnetic head 200 of the present invention includes a CPP sensor 210 that is depicted in FIGS. 8, 9 and 10, wherein FIG. 8 is an elevational view taken from the air bearing surface of a magnetic head 200, FIG. 9 is a plan view taken along lines 9-9 of FIG. 8, and FIG. 10 is a side cross-sectional view taken along lines 10-10 of FIG. 8. The magnetic head 200 includes many features and structures that are substantially similar to those of the prior art magnetic head 32, and such similar structures have been identically numbered for ease of comprehension. These layers include a first magnetic shield layer 34 that is fabricated upon or over an electrical insulation layer 36 that is deposited upon or over a wafer substrate 38. While many different layered sensor structures are known in the prior art, a typical sensor layer structure will include an antiferromagnetic (AFM) layer 220 which may be comprised of a Pt—Mn or Ir—Mn alloy that is fabricated upon the first magnetic shield layer 34. The top surface 224 of the AFM layer is ion milled, as is described below. A pinned magnetic layer 240 is then fabricated upon or over the milled surface 224 of the antiferromagnetic layer 220, and it may be comprised of a magnetic material such as a Co—Fe alloy. In alternative embodiments the pinned magnetic layer 240 may be comprised of a multilayer structure (not shown) such as Co—Fe, Ru, Co—Fe, as is known in the art. The direction of magnetization of the pinned magnetic layer (see arrow 242) is generally perpendicular to the air bearing surface (ABS) 94 of the magnetic head.

Thereafter, a tunnel barrier layer 50 is fabricated upon or over the pinned magnetic layer 240, where the tunnel barrier layer 50 may be comprised of an electrical insulation material such as $MgO_x$, $TiO_x$, and $AlO_xe$ where the subscript x indicates that the oxide need not be stoichiometric. In a CPP GMR sensor structure the layer 50 will be comprised of a conductive material such as copper. A free magnetic layer 54 is then fabricated upon or over the layer 50, where the free magnetic layer 54 may be composed of a magnetic material such as a Co—Fe alloy or a Ni—Fe alloy. Alternatively, the free magnetic layer may be comprised of an antiparallel coupled layer structure of materials such as CoFe/Ru/CoFe, as is known to those skilled in the art. The direction of magnetization of the free magnetic layer (see arrow 56) is nominally in the plane of the free magnetic layer, however it is free to rotate in response to the magnetic field of magnetic data bits of the disk 12. Thereafter, a cap layer 62 is typically fabricated upon or over the free magnetic layer 54, and a typical cap layer may be comprised of a material such as rhodium, ruthenium or tantalum or a combination thereof. The layers 220, 240, 50, 54, 62 are then masked and ion milled in a plurality of steps to create a central sensor stack 248 having a back wall 66 and side walls 70. As seen in the elevational view of FIG. 8, the distance between the side walls 70 of the sensor 30 defines the read width W of the sensor.

Following the ion milling steps for creating the back wall 66 and side walls 70, a thin layer of electrical insulation 74 is next deposited upon the device, particularly upon the side walls 70, utilizing a process such as atomic layer deposition (ALD). Thereafter, magnetic hard bias elements 76, typically composed of a material such as a Co—Pt alloy, are fabricated upon or over the insulation layer 74 proximate the side walls 70. A second magnetic shield 86 is then fabricated upon or over the cap layer 62 and hard bias elements 76. In fabricating the head 200, following the fabrication of the read head structures, and following subsequent fabrication steps to create write head structures (not shown), an air bearing surface (ABS) 94 is created. The distance between the ABS 94 and the back wall 66 of the sensor stack is the stripe height (SH) of the sensor.

The improved CPP sensor 210 has a pinned magnetic layer 240 with improved magnetization stabilization. This improved magnetization stabilization is created by the fabrication of the pinned magnetic layer 240 upon the ion milled surface 224, where an ion milling step is conducted on the surface of the AFM layer prior to the deposition of the pinned magnetic layer 240 thereon. The ion milling is preferably conducted at a grazing angle of from 45° to 80° from normal to the surface 224 of the AFM layer, and as can be seen in FIGS. 8 and 9 the ion milling results in a conditioned surface 224. The ion milling is conducted in a direction (see arrow 232) that is the same direction as the desired direction (see arrow 242) of the magnetization of the pinned magnetic layer 240; that is, perpendicular to the ABS surface 94 of the magnetic head 200. In the preferred embodiment, the ion milling step utilizes ion species from a gas such as Argon having an ion energy of from 30 eV to 200 eV and preferably less than 100 eV, where the ion milling is conducted at a grazing angle in the desired direction of magnetization of the pinned magnetic layer. For a pinned magnetic layer having a thickness of approximately 1.5 nm, the inventors have determined that an increase in magnetization of 200 to 400 Oe is obtained by this ion milling step.

Figure 11:
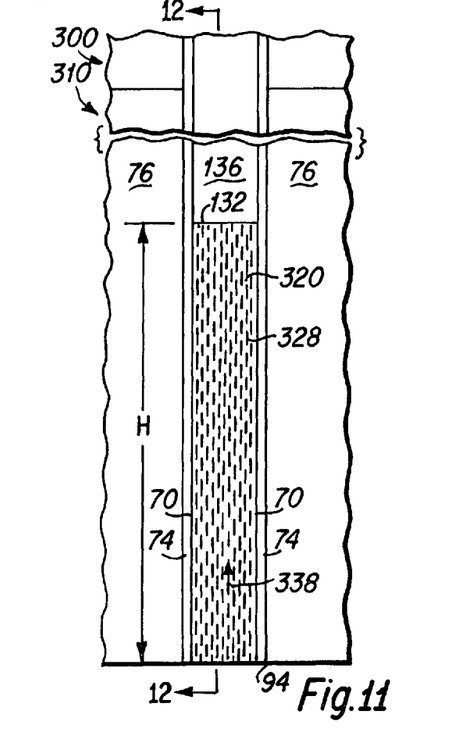
FIG. 11 is a top plan view depicting the tunnel barrier sensor portion of and another magnetic head embodiment of the present invention.
Figure 12:
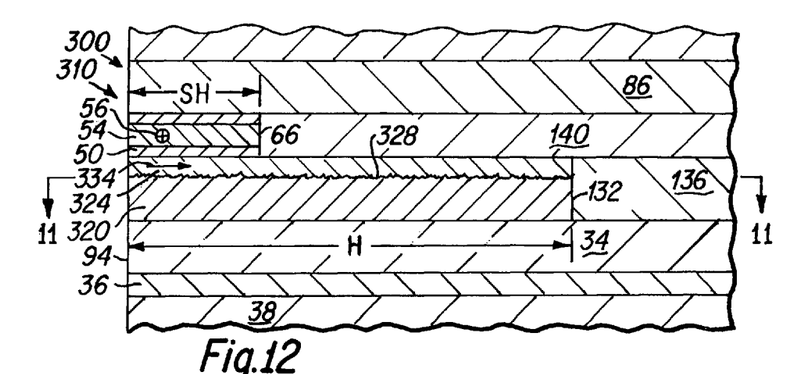
FIG. 12 is a side cross-sectional view of the tunnel barrier sensor of FIG. 11, taken along lines 12-12 of FIG. 11.

The techniques described above for improving the stabilization of the magnetization of the pinned magnetic layer are combined in an embodiment of the present invention to yield an improved magnetic head 300, as is depicted in the top plan view of FIG. 11 and side cross-sectional view of FIG. 12, that is taken along lines 12-12 of FIG. 11. As is depicted therein, the CPP sensor 310 of the magnetic head 300 is formed with an elongated AFM layer 320 and pinned magnetic layer 324, having a height H, as has been described in detail hereabove with regard to magnetic head embodiment 100 depicted in FIGS. 5-7. The direction of magnetization 334 of the pinned magnetic layer 324 is perpendicular to the ABS 94. Additionally, the surface 328 of the AFM layer 320 has been ion milled in the same direction 338 as the direction 334 of magnetization of the pinned magnetic layer 324 at a grazing angle of from 45° to 80° from normal to the surface 328 of the AFM layer, in accordance with the CPP sensor 210 of magnetic head 200 as depicted in FIGS. 8 and 9 and described hereabove. The elongated pinned magnetic layer 324 has been fabricated upon the conditioned ion milled surface 328 of the AFM layer 320. The improved CPP sensor 310 of an embodiment of the present invention also includes a third improvement of a pinned magnetic layer that is comprised of a high positive magnetostriction material such as CoFe, where a high Fe concentration of 40 at. % to 50 at. % is utilized. The improved CPP sensor 310 will have an increased stabilization of the magnetization of the pinned magnetic layer 324 as a result of the combined effects of improved shape anisotropy, and directional surface milling to condition the surface upon which the pinned magnetic layer is fabricated, and high positive magnetostriction material that comprises the pinned magnetic layer.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

I claim:
1. A magnetic head, comprising:
  a CPP read sensor including a pinned magnetic layer and a free magnetic layer, wherein said sensor is formed with an air bearing surface (ABS);
  wherein a back wall of said free magnetic layer defines a sensor stripe height SH between the ABS and said back wall of said free magnetic layer;

wherein said pinned magnetic layer has a back wall that defines a height H of said pinned magnetic layer between said ABS and said back wall of said pinned magnetic layer, and wherein H is greater than SH; and wherein said pinned magnetic layer is formed with a thickness t where the ratio of t/H is from approximately 1/10 to approximately 1/500; and wherein said pinned magnetic layer is comprised of a high positive magnetostriction material that is disposed upon a conditioned surface that has been ion milled, wherein said conditioned surface has physical characteristics of being ion milled in a same direction as a direction of magnetization of the pinned magnetic layer at a grazing angle of from approximately 45° to approximately 80° from normal to said conditioned surface.

2. A magnetic head as described in claim 1 wherein the ratio of t/H is within the range of from approximately 1/100 to approximately 1/400.

3. A magnetic head as described in claim 1 wherein t is within the range of from approximately 1 nm to approximately 6 nm.

4. A magnetic head as described in claim 1 wherein H is within the range of from approximately 30 nm to approximately 3000 nm.

5. A magnetic head as described in claim 1 wherein said pinned magnetic layer is comprised of at least one layer of CoFe, where the Fe composition is in the range of from 40 at. % to 50 at. %.

6. A magnetic head as described in claim 1 wherein said sensor is a GMR sensor.

7. A magnetic head as described in claim 1 wherein said sensor is a TMR sensor.

8. A magnetic head as described in claim 1 wherein said sensor further includes an AFM layer that is formed with a height H.

9. A magnetic head as described in claim 8 wherein said surface is a top surface of said AFM layer.

10. A magnetic head as described in claim 1 wherein said sensor further includes an underlayer that is formed with a height H.

11. A magnetic head as described in claim 10 wherein said conditioned surface is a top surface of said underlayer.

12. A hard disk drive, comprising:
a rotatable hard disk;
a magnetic head being disposed for reading data from said hard disk, said magnetic head, including:
a CPP read sensor including a pinned magnetic layer, and a free magnetic layer, wherein said sensor is formed with an air bearing surface (ABS);

wherein a back wall of said free magnetic layer defines a sensor stripe height SH between the ABS and said back wall of said free magnetic layer;

wherein said pinned magnetic layer has a back wall that defines a height H of said pinned magnetic layer between said ABS and said back wall of said pinned magnetic layer, and wherein H is greater than SH; and wherein said pinned magnetic layer is formed with a thickness t where the ratio of t/H is from approximately 1/10 to approximately 1/500; and wherein said pinned magnetic layer is comprised of a high positive magnetostriction material that is disposed upon a conditioned surface that has been ion milled wherein said conditioned surface has physical characteristics of being ion milled in a same direction as a direction of magnetization of said pinned magnetic layer at a grazing angle of from approximately 45° to approximately 80° from normal to said conditioned surface.

13. A hard disk drive as described in claim 12 wherein the ratio of t/H is within the range of from approximately 1/100 to approximately 1/400.

14. A hard disk drive as described in claim 12 wherein t is within the range of from approximately 1 nm to approximately 6 nm.

15. A hard disk drive as described in claim 12 wherein H is within the range of from approximately 30 nm to approximately 3000 nm.

16. A hard disk drive as described in claim 12 wherein said pinned magnetic layer is comprised of at least one layer of CoFe, where the Fe composition is in the range of from 40 at. % to 50 at. %.

17. A hard disk drive as described in claim 12 wherein said sensor is a GMR sensor.

18. A hard disk drive as described in claim 12 wherein said sensor is a TM sensor.

19. A hard disk drive as described in claim 12 wherein said sensor further includes an AFM layer that is formed with a height H.

20. A hard disk drive as described in claim 19 wherein said surface is a top surface of said AFM layer.

21. A hard disk drive as described in claim 12 wherein said sensor further includes an underlayer that is formed with a height H.

22. A hard disk drive as described in claim 21 wherein said conditioned surface is a top surface of said underlayer.

* * * * *